United States Patent [19]

Place, Jr.

[11] Patent Number: 4,786,548

[45] Date of Patent: Nov. 22, 1988

[54] LOW LOSS RADAR WINDOW FOR REENTRY VEHICLE

[75] Inventor: Thomas M. Place, Jr., Costa Mesa, Calif.

[73] Assignee: The United States of America as represented by the Secretary of the Air Force, Washington, D.C.

[21] Appl. No.: 95,062

[22] Filed: Sep. 10, 1987

[51] Int. Cl.⁴ ............................................. D03D 3/00
[52] U.S. Cl. .................................. 428/225; 428/245; 428/257; 428/408
[58] Field of Search ............... 428/225, 245, 257, 408

[56] References Cited

U.S. PATENT DOCUMENTS

| | | | |
|---|---|---|---|
| 3,240,614 | 3/1966 | Murata et al. | 106/39 |
| 3,620,780 | 11/1971 | Economy et al. | 106/55 |
| 3,811,900 | 5/1974 | Fassell | 106/55 |
| 3,857,744 | 12/1974 | Moss | 156/60 |
| 4,007,049 | 2/1977 | Rossi et al. | 106/58 |
| 4,248,752 | 2/1981 | Myles | 260/29.1 R |

Primary Examiner—James J. Bell
Attorney, Agent, or Firm—Stanton E. Collier; Donald J. Singer

[57] ABSTRACT

A radar window for a reentry vehicle where the window is made of a composite material of boron nitride, silica, and boron nitride yarn. Silica in the range of 2 to 18 percent is the preferred range in the composite material and the boron nitride matrix ranges from 5 to 15 percent.

5 Claims, 1 Drawing Sheet

FIG. IA
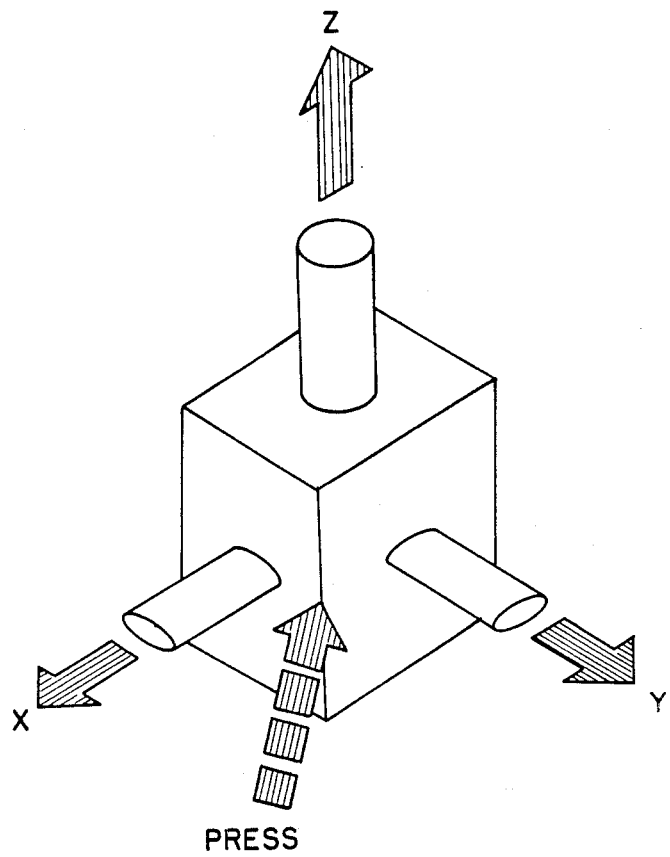
PRESS
FIG. IB
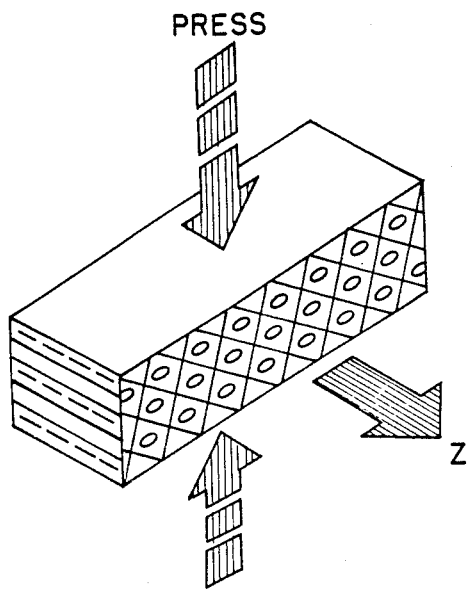

LOW LOSS RADAR WINDOW FOR REENTRY VEHICLE

STATEMENT OF GOVERNMENT INTEREST

The invention described herein may be manufactured and used by or for the Government for governmental purposes without the payment of any royalty thereon.

BACKGROUND OF THE INVENTION

The present invention is related to reentry vehicles that pass through the Earth's atmosphere on their final trajectory, and, in particular, relate to the materials that compose the radar window that is used in these reentry vehicles.

The development of materials characterized by an improved resistance to thermal ablation, with a high threshold for thermal and mechanical fracture has become a problem of particular importance with the recent advances achieved in rocket technology and especially in the development of antenna windows for advanced reentry vehicles. A number of materials have been suggested during the many attempts to solve these problems. For example, various ceramic oxides and nitrides such as aluminum oxide, beryllium oxide, magnesium oxide and boron nitride have been evaluated for use as antenna window material in advanced reentry vehicles because of their combined refractoriness and high temperature dielectric properties. However, the oxides are susceptible to failure by thermal fracture and rapid loss by melting at ultra high temperatures while boron nitride, which decomposes by sublimation at reentry temperatures, is subject to mechanical failure caused by shock wave loading.

The use of boron nitride fiber yarn, in particular, has allowed its incorporation into a more desirable composite form and, thus, has potential use as an antenna window. Ablation data has indicated that boron nitride three dimensionally reinforced composite has a recession rate similar to tape-wrapped carbon phenolic (TWCP) heat shield material used in reentry vehicles.

SUMMARY OF THE INVENTION

The present invention overcomes the problems noted above by providing a composite material of boron nitride having the selective addition of silica therein.

Addition of silica to composites of boron nitride offers a solution to an unresolved problem of finding a material for a recession match with tape-wrapped carbon phenolic and carbon-carbon (TWCP & C/C) materials. The silica addition also increases strength, enhances shock wave attenuation properties, and decreases surface ablation temperature.

In particular, a 3-directionally woven preform containing boron nitride yarn was first impregnated with boron nitride (BN) precursor of boric acid and converted to BN to provide a matrix of BN material within a reinforced structure of BN fibers: matrix content varied from 3.9 to 15.5 w/o (weight percent). Subsequently, colloidal silica ($SiO_2$) was introduced into the matrix yielding quantities of 2.4 to 17.9 w/o following sintering or hot pressing. The BN billets were heat treated by four processes'(a) hot press after BN matrix conversion, (b) hot press after BN matrix conversion and sinter of silica matrix addition, (c) impregnate and sinter silica in hot pressed BN billet (process (a), or (d) re-hot press process a. after process c. Composite bulk densities of 1.78 to 1.88 gm/cc containing 5.1 and 2.5 weight percent $SiO_2$ exhibited close recession matches with TWCP when tested in a 10 mw arc jet. Post-test analyses of these samples revealed depletion of $SiO_2$ in a band 1.3 mm below the hot surface suggesting a transpiration effect caused by silica diffusion to the hot surface through the BN fiber structure, thus possibly causing (a) a decrease in surface temperature (b) a melt layer sweep of undesireable BN decomposition products, and (c) reducing the effective temperature of BN below its intrinsic electric conduction temperature. Hot transmission tests (X-band) at a heat flux of 2600 BTU/$ft^2$-sec of 3 BN composites containing 0, 8.11, and 17.88 weight percent $SiO_2$ exhibited attenuation losses of 40, 25, and 5 db, respectively, thus showing the potential influence of $SiO_2$ additions to BN composites for the reduction of high temperature microwave attenuation. The tensile strength of samples containing 5.26% $SiO_2$ was four times greater (600 psi to 2472 psi) than $SiO_2$ free BN.

It is therefore one object of the present invention to provide a ceramic composite material for an antenna window in a conventional heat shield of a reentry vehicle whose ablation rates are substantially equal; and It is another object of the present invention to provide an antenna window material having the following properties:

(a) Dielectric loss tangent of 0.01 or less and an X-band hot transmission attenuation loss of less than $-2db$;

(b) Recession rate of 0.004 inch/sec (0.101 cm/sec) in a 10 MW arc;

(c) Room temperature mechanical strengths of:
3500 psi (24.1 $MN/m^2$) tensile,
5000 psi (34.5 $MN/m^2$) compression,
5000 psi (34.5 $MN/m^2$) flexure; and (d) Thermal expansion consistent with the intrinsic properties of BN and BN yarn structure.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIGS. 1A and 1B illustrate orientation of orthogonal woven structure of boron nitride for densification by hot pressing.

DETAILED DESCRIPTION OF THE PREFERRED EMBODIMENT

In order to produce the radar window of the present invention, boron nitride yarn is obtained from a conventional source. U.S. Pat. No. 3,620,780, entitled "Boron Nitride Fiber Manufacture," is incorporated by reference as to the making of boron nitride fibers. Yarn having the specifications noted in Table I is useable for the present invention.

TABLE I

| | |
|---|---|
| Filament Strength | 50,000–1000,000 psi (34.47–689.5 $MN/M^2$) |
| Nominal Yarn Diameter | .060 inch (1.52 mm) |
| Filament Density | 1.8 Gm/cc |
| Yarn | 2-Ply, 10,000 ends/ply |
| Twist | 6/inch (2.36/cm) |
| Yarn Weight** | 400–500 yards/lb (805–1007 m/kg) |
| Average Breaking Strength | 8 lbs |

TABLE I-continued (3.6 Kg)

The principal contaminant of the above yarn in the samples examined was silicon, probably in the form of borosilicate. The containments are as follows in parts per million: silicon, 500; aluminum, 100; sodium, 12; and potassium, 1.

One type of weaving used to test the inventive materials was an orthogonal 3D weave preform. The weave is comprised of a 1, 1, 1 structure with single 2-ply yarns in each of the Z, X and Y directions, respectively. Other orientations are feasible. Axial yarn center-to-center spacing was 0.02 inch and the X-Y direction layer-to-layer spacing was 0.091 inch (11 layers per inch). The X and Y yarns intercepted the sides of the preform at 45 degrees to conserve material and facilitate efficient cutting for hot pressing. A schematic view of the yarn orientation for hot pressing is shown in FIG. 1.

Impregnation employs a boric acid precursor impregnated into the woven preform followed by conversion of the boric acid to boron nitride and final densification by hot pressing.

Boron oxide is soluble in water, forming boric acid according to equation:

$$B_2O_3 + 3H_2O \rightleftharpoons 2H_3BO_3 \qquad (1)$$

Impregnation of the woven preform with a saturated solution of boric acid at 90° C. deposits a solution containing approximately 10% $B_2O_3$. By chilling to near 0° C., crystalline boric acid can be precipitated which, when followed by vacuum drying to remove the water of crystallization, can be retained within the structure for subsequent conversion to BN. Conversion to BN proceeds by the classical reaction described in equation (2) which gives a theoretical yield of 71.1% BN. in this case, a net theoretical yield of 7.1% based on a 10% $B_2O_3$ content.

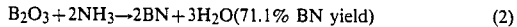

$$B_2O_3 + 2NH_3 \rightarrow 2BN + 3H_2O (71.1\% \text{ BN yield}) \qquad (2)$$

Following impregnation and chill drying, the preform is reaction sintered to 1200° C. in a boron nitride conversion apparatus. A typical 100-hour reaction conversion cycle causes a temperature/time step function relationship from room temperature to 600° C. during the final dehydration of the boric acid and boron oxide and the onset of the formation of BN which has been found in this process to be essentially complete at 600° C. Above 600° C., moderate crystal growth and stabilization of the BN structure is the primary concern. Nitrogen flow of 945 Ml/min was utilized to supplement a 1000 Ml/min flow of anhydrous ammonia from room temperature to 600° C. to aid the removal of the water vapor reaction product described in equation (2).

Stabilization of the BN matrix was performed in an RF graphite retort containing an interior of boron nitride. During this program stabilization cycle, temperatures were limited between 1500° C. and 1600° C. to preclude excessive BN crystal growth at the expense of and deterioration of the BN fibers. Essentially, the stabilization cycle as described in Table II controls the reduction of the surface area of the matrix BN crystals to moderate their over reactivity to preclude excessive matrix/fiber reaction leading to the loss of fiber integrity during hot pressing.

TABLE II

| TIME MINUTES | OPTICAL TEMPERATURE °C.(UNCORR.) | |
| --- | --- | --- |
| 0 | NO COLOR | N₂ FLOW 4700 Ml/min. |
| 20 | | |
| 35 | | |
| 65 | 1010 | |
| 95 | 1304 | |
| 125 | 1504 | |
| 485 | 1504 ± 10 | |

Nominally each preform is processed with three impregnation cycles each followed by vacuum chill drying, reaction sintering, and stabilization treatment prior to hot pressing. This procedure results in an average BN matrix content of 8 to 12 percent and a preform bulk density of 0.9 to 1.0 Gm/cc which has been experimentally determined to yield an optimum hot pressed bulk density of 1.6 Gm/cc or greater. Pre-hot press bulk densities in excess of 1.0 Gm/cc have been generally found to limit final not press densities to less than 1.6 Gm/cc. Hot pressing was performed in reinforced graphite tooling employing high pressure laminated carbon-carbon reinforced punches. Internal components of the die were fabricated from ATJ graphite and were retained inside a uniaxially reinforced carbon-carbon cylinder.

Prior to hot pressing, each preform was cut into four billets each of which was machined to pressing cross sectional dimensions of 3.5 × 2.0 inches (8.9 × 5 cm) with a nomimal thickness of 1.3 inches (3.3 cm). In some cases the thickness was increased to accommodate a particular part requirement. Compression ratios of 1.6 to 1.7 were required to attain bulk densities in excess of 1.6 Gm/cc.

Hot pressing of the billets was preformed in accordance with a nominal cycle and pressure was increased as step functions of temperature with a final hold at 10,000 psi and a nominal 1600° C. until the ram displacement had decreased to less than 0.001 inch/min. (0.025 mm/min.). Initiation of pressure in the case of silica addition was begun above 1400° C. to assure displacement of the silica near its working point to avoid excessive damage to the billet or fiber. Final pressing temperature was limited to 1450° C. In all cases, the billets were cooled with the press ram locked, resulting in constantly decreasing pressure with declining temperature. Multiple hot press cycles were employed to attain the final product.

Silica was introduced into the billets by pressure impregnation of a high purity colloidal sol at 10,000 psi (69 MN/m²), followed by drying and sintering at 700° or 800° C. Three process sequences were investigated: (1) impregnation of silica following BN matrix development (prior to hot pressing); (2) post hot press impregnation; and (3) post hot press impregnation followed by repressing. In each sequence, the colloidal silica impregnated billet was sintered in flowing nitrogen to react and stabilize the silica. The highest concentration of silica (17.9%) was attained with the prepress impregnation sequence. Post press impregnation uptake was governed by the pressed density, but was in general easier to control. Pressing or repressing following silica additions provide the highest bulk densities with values of 1.8 Gm/cc or greater. Reduction and control of the maximum pressing temperature was necessary to prevent fusion of the BN and silica which formed a high density monolithic core in the billet.

Silica additions significantly broadened the range of bulk densities of the composition available for tailoring or matching heat shield recession rates. After time and temperature limits were experimentally determined for billets containing silica additions, bulk densities on the order of 1.8 Gm/cc were regularly obtained. It was also noted that densification of billets from a preform, which had a 112 structure containing an 84% volume fraction of yarn in the Z direction compared to 40% in the 111 structure, was readily densified with fusion (high density) observed in two of the four billets. Hot press of compositions of these preforms, containing 2.5% and 8% silica respectively, prior to repressing or hot pressing, were densified to 1.86 Gm/cc with full retention of fiber integrity. These billets were superior material and represented a significant improvement in composition fabrication techniques and ablative/erosion performance as reflected by subsequent 50 MW and 10 MW tests. From a fabricability point of view, economics favor a prepress impregnation of silica followed by one hot press cycle—which is clearly feasible.

Four models were fabricated to fit an arc test fixture for an X-band window. Each model was a tapered plug 0.50 inch (1.27 cm) in diameter, 0.4 inch (1.02 cm) thick containing three thermocouples with the assembly mounted in a 1 inch (2.54 cm)×2.0 inch (5.08 cm)×0.5 inch (1.27 cm) thick block of TWCP. Two compositions were evaluated: Models 91A and 91B contained 5.1% silica and 96C and 96D contained 2.5% silica.

Four specimens were evaluated: three (HP 68S, HP 93, and HP 94) containing silica impregnated following hot pressing; and one (HP 98) containing 8.0 percent silica added prior to hot pressing. Bulk densities ranged from 1.59 to 1.96 Gm/cc. From the point of view of the stability of the loss tangent, sample HP 68S showed the least change with temperature with a loss tangent of 0.001 to 0.0009 from room temperature to 1000° C. Dielectric data summarized in Table III reflect relatively flat dielectric constants for all samples with a direct relationship between bulk density and dielectric constant.

TABLE III

| SUMMARY OF X-BAND DIELECTRIC MEASUREMENTS OF BN-3DX @ 9.375 GHz | | | | | | | | |
|---|---|---|---|---|---|---|---|---|
| SAMPLE NO. | HP 68 S[1] | | HP 93[1] | | HP 94[1] | | HP 98[2] | |
| BULK DENSITY, Gm/cc | 1.6 1.60 | | 1.59 | | 1.62 | | 1.96 | |
| % SILICA CONTENT | 8.3 | | 5.6 | | 4.8 | | 8.0 | |
| TEMPERATURE | DIEL. CONST. k' | LOSS TAN. tan | DIEL. CONST. k' | LOSS TAN. tan | DIEL. CONST. k' | LOSS TAN. tan | DIEL. CONST. k' | LOSS TAN. tan |
| 25 | 3.24 | .001 | 3.31 | .004 | 3.35 | .003 | 4.08 | .004 |
| 300 | 3.22 | .0009 | 3.26 | .002 | 3.32 | .002 | 4.03 | .004 |
| 700 | 3.20 | .0009 | 3.24 | .001 | 3.31 | .0009 | 4.01 | .003 |
| 1000 | 3.23 | .001 | 3.27 | .003 | 3.34 | .002 | 4.05 | .005 |

[1]Silica added after hot pressing.
[2]Silica added prior to hot pressing.

Recession rate data summarized in Table IV show average rates of 0.0038 to 0.0050 inch/second (0.096 to 0.127 mm/second). These rates compare favorably with TWCP tested under near identical conditions with average recession rates of 0.0043 inch/second (0.109 mm/second). Recession behavior appears directly related to bulk density and is not significantly affected by the level of silica (2.5 to 5.1%) in these models. Models HP 91B and HP 96D gave the best performance and depict a close recession match with TWCP at bulk densities of 1.78 to 1.84 Gm/cc.

Model HP 96C with a density of 1.88 Gm/cc exhibited 2 spall events 8 to 10 seconds into the run. This may suggest an upper limit on the hot pressed density of the composition containing silica; however, subsequent analyses for the presence of a silica cristobalite phase, which goes through a displacive transformation at 200° to 270° C., was negative for these materials. Materials of similar bulk densities exposed to much higher heat fluxes of 2600 Btu/ft$^2$-sec in the 10 MW heat transmission measurements showed no evidence of thermal spallation.

TABLE IV

| | RECESSION PERFORMANCE OF BN-3DX PLUGS* | | | | | |
|---|---|---|---|---|---|---|
| MODEL | INITIAL[1] THICKNESS in. | POST TEST[1] THICKNESS in. | S in. | S[3] in./sec | BULK DENSITY Gm/cc | PERCENT SiO$_2$ |
| HP91A | 0.380 | 0.301 | 0.079 | 0.0053 | 1.74 | 5.1 |
| HP96C | 0.380 | 0.305 | 0.075 | 0.0050[2] | 1.88 | 2.5 |
| HP96D | 0.380 | 0.323 | 0.057 | 0.0038 | 1.84 | 2.5 |
| HP91B | 0.380 | 0.320 | 0.060 | 0.0040 | 1.78 | 5.1 |

*Plugs at 1.25 inch station.
[1]At center of plug.
[2]Observed 2 spall actions in motion picture in aft portion of surface.
[3]Worst case at center of plug.

A post-test cross section of Model 91A was mounted in acrylic, polished and examined for the presence of silica. This cross section showed a light area 40 to 50 mils (1 to 1.3 mm) thick below the ablated surface of the plug. The dark area is more porous and is decorated as an artifact of the polishing procedure. An electron microprobe scan of Model 96D which looked like Model 91A) for silicon was performed with a vertical traverse from the ablated surface toward the base of the plug. The result of the traverse describes a relatively silica-free region 40 to 50 mils (1 to 1.3 mm) thick below the surface followed by a normal distribution of silica (2.5%) toward the bottom of the plug.

It was concluded that during ablation, silica diffused through the structurally rigid BN fibers toward the surface and created a transpiration effect in addition to sweeping the surface as observed in the motion picture film of the tests. The composition structure may also have enhanced the efficiency of silica by retaining it below the surface at a higher temperature before losing it to surface runoff—in effect, getting more heat into the silica before it is swept off. Typically, silica ablation brightness temperatures are recorded at 2200° to 2400° C. and, after applying an emissivity correction, are on the order of 2500° C. All factors considered, silica, with a boiling temperature of 3300° C. at 1.4 atmospheres, reaches about 0.75 of its potential decomposition temperature before being lost to melt runoff. The composition structure offers a means of optimizing a BN-SiO$_2$ hybrid composite with trade-offs of ablation efficiency, together with electrical performance, mechanical strength, and resistance to errosion.

Additions of 2 to 18% of high purity silica to the composite matrix have: improved fabricability; increased bulk density and strength to acceptable levels for reliable design and performance; maintained or improved ablation/recession performance comparable to TWCP; created a complex surface reaction during ablation to favorably modify the electrical, mechanical, and thermochemical behavior of BN during decomposition; and shown a potential for improving the high temperature dielectric performance of the composite with additions of silica.

Clearly, many modifications and variations of the present invention are possible in light of the above teachings and it is therefore understood, that within the inventive scope of the inventive concept, the invention may be practiced otherwise than specifically claimed.

What is claimed is:

1. A composite material for use in a radar window of a reentry vehicle, said vehicle being exposed to temperatures in excess of 2200° C. upon reentry, said composite material comprising:
   a yarn of boron nitride, said yarn woven in a selective pattern to form a preform;
   boron nitride, said boron nitride impregnated throughout said preform to form a matrix composite; and
   silica, said silica being impregnated throughout said matrix composite, said silica being about 2 to about 20 weight percent of said composite material;
   whereby said composite material is substantially recession matched to a surrounding surface of tape-wrapped carbon phenolic materials.

2. A composite material as defined in claim 1 wherein said boron nitride impregnated ranges from about 5 to about 15 weight percent of said composite.

3. A composite material as defined in claim 1 wherein said silica is in a range of about 2 to 5 weight percent, said range providing substantial recession match to tape-wrapped carbon phenolic.

4. A composite material as defined in claim 1 wherein said silica is about 18 weight percent, said silica providing minimum attenuation loss at X-band wavelengths.

5. A composite as defined in claim 1 wherein pressure impregnating of a high purity colloidal sol of silica at about 10,000 psi and sintering occurs in a range from 700° C. to about 800° C.

* * * * *